(12) United States Patent
Hartenstein (10) Patent No.: US 11,560,087 B1
(45) Date of Patent: Jan. 24, 2023

(54) HOUSING FOR CONNECTING A LIGHT BAR TO A VEHICLE

(71) Applicant: AAC Enterprises LLC, Metairie, LA (US)

(72) Inventor: Justin Hartenstein, Metairie, LA (US)

(73) Assignee: AAC Enterprises LLC, Metairie, LA (US)

( * ) Notice: Subject to any disclaimer, the term of this patent is extended or adjusted under 35 U.S.C. 154(b) by 0 days.

(21) Appl. No.: 17/813,449

(22) Filed: Jul. 19, 2022

Related U.S. Application Data (60) Provisional application No. 63/226,094, filed on Jul. 27, 2021.

(51) Int. Cl.
*B60Q 1/26* (2006.01)
*B60Q 1/04* (2006.01)

(52) U.S. Cl.
CPC ............. *B60Q 1/26* (2013.01); *B60Q 1/0433* (2013.01)

(58) Field of Classification Search
CPC .................................................. B60Q 1/2611
See application file for complete search history.

(56) References Cited

U.S. PATENT DOCUMENTS

| 5,988,839 A | 11/1999 | Pokorney et al. | |
|---|---|---|---|
| 7,431,485 B1 | 10/2008 | Saward et al. | |
| 2004/0252021 A1* | 12/2004 | Frank | B60Q 1/2611 340/472 |
| 2017/0072838 A1* | 3/2017 | Neufeglise | B60Q 1/52 |
| 2017/0120805 A1* | 5/2017 | Marchese | B60Q 1/2611 |
| 2019/0126809 A1* | 5/2019 | Wymore | B60R 19/50 |

* cited by examiner

*Primary Examiner* — Evan P Dzierzynski
(74) *Attorney, Agent, or Firm* — Edwin A. Sisson, Attorney at Law, LLC; Jeffrey J. Banyas (57) ABSTRACT

A housing for connecting a light bar to a vehicle comprises at least a front surface comprising a lighting aperture, a first side surface, a second side surface opposite the first side surface, and a top surface defining a hollow interior. The housing further comprises at least a first bracket and a second bracket located within the hollow interior. The first bracket is configured to connect a first interior face of the housing to a first side of the light bar while the second bracket is configured to connect a second interior face of the housing to a second side of the light bar. At least a portion of at least one of the front surface, the first side surface, the second side surface, the first bracket, and/or the second bracket is configured to connect to a surface of the vehicle.

18 Claims, 9 Drawing Sheets

HOUSING FOR CONNECTING A LIGHT BAR TO A VEHICLE

CROSS REFERENCES AND PRIORITIES

This Application claims priority from U.S. Provisional Application No. 63/226,094 filed on 27 Jul. 2021, the teachings of which are incorporated by reference herein in their entirety.

BACKGROUND

Exterior lighting systems for vehicles are well known in the art and are often used for safety and/or for enhancing the aesthetic appeal of a vehicle. In addition to headlights, taillights, brake lights, turn signal lights and the like which come standard on most vehicles, in some instances additional exterior lights may be added to a vehicle. Often exterior lights are added to a vehicle to assist with visibility of trails and roads when a vehicle if outfitted and utilized for offroad and overlanding applications.

One example of such an additional exterior light is known as a light bar. One or more light bars commonly attach to a forward or rear facing surface of the vehicle such as the vehicle roof, grill, front bumper, or rear bumper. Common light bars consist of a plurality of lighting elements—often in the form of light-emitting diodes (LEDs)—located within a rigid containment structure.

In many prior art embodiments, the rigid containment structure of the light bar connects to the vehicle by a plurality of exposed brackets. For example, when the light bar is connected to the vehicle's roof, the exposed brackets may include one bracket which connects to and extends upwardly from a front window pillar on the driver's side of the vehicle and another bracket which connects to and extends upwardly from a front window pillar on the passenger's side of the vehicle. The two brackets may then attach to opposing sides of the rigid containment structure.

Such prior art embodiments—while providing functional use of a light bar—are rudimentary and not aesthetically desirable for many vehicle owners. In addition, the exterior mounting profile of the light bar and brackets can negatively impact the aerodynamic profile of the vehicle.

Many attempts have been made to improve the aesthetic appearance and/or aerodynamic profile when mounting exterior lights on a vehicle. One such example is disclosed in U.S. Pat. No. 5,988,839 which discloses a rear-facing, under roof-line light bar. . . [which] comprises a unitary housing, aerodynamically shaped to fit on a particular vehicle, which has an open bottom. This housing supports a single tier array of rear-facing, individually controllable, light generators which may be energized to create any desired illumination pattern.

Another example is disclosed in U.S. Pat. No. 7,431,485 which discloses a lighting assembly for a vehicle. . . that may be secured to an exterior surface of the vehicle and configured to conform to the aerodynamic lines of the vehicle without disturbing the interior of the vehicle. The lighting assembly includes an elongated base plate having an inner and an outer surface. The base plate includes at least one opening. At least one light source is adapted to be mounted to the base plate at the opening. The base plate is also configured to be mounted and to conform to an exterior surface of the vehicle.

The prior art attempts generally rely upon a complicated series of hardware to connect the light bar to the vehicle. Such hardware can be difficult to install and often results in an undesirable aesthetic appearance once the light bar is connected to the vehicle. Additionally, when the light bar is attached to a vehicle roof, the prior art solutions often result in the light bar extending beyond the top surface of the vehicle roof which negatively impacts the aerodynamic profile of the vehicle.

The need exists, therefore, for an improved system and method for connecting a light bar to a vehicle which is both aesthetically desirable and reduces or eliminates disruptions to the vehicle's aerodynamic profile.

SUMMARY

Disclosed herein is a housing for connecting a light bar to a vehicle. The housing comprises a front surface, a first side surface, a second side surface, and a top surface defining a hollow interior. The front surface comprises a lighting aperture.

The housing further comprises at least a first bracket and a second bracket located within the hollow interior. The first bracket is configured to connect a first interior face of the housing to a first side of the light bar. The second bracket is configured to connect a second interior face of the housing to a second side of the light bar.

At least a portion of at least one of the front surface, the first side surface, the second side surface, the first bracket, and/or the second bracket is configured to connect to a surface of the vehicle.

In certain embodiments, a first fastener may connect the first bracket to the first side of the light bar. Similarly, in some embodiments, a second fastener may connect the second bracket to the second side of the light bar.

In some embodiments, the first bracket may be removably connected to the housing within the hollow interior along the first side surface. In some such embodiments, the first bracket may be configured to frictionally engage with the housing. In other such embodiments, the first bracket may be configured to connect to the housing by a fifth fastener.

In certain embodiments, the second bracket may be removably connected to the housing within the hollow interior along the second side surface. In some such embodiments, the second bracket may be configured to frictionally engage with the housing. In other such embodiments, the second bracket may be configured to connect to the housing by a sixth fastener.

In some embodiments, the first bracket may be integrally connected to the housing within the hollow interior along the first side surface. Similarly, in certain embodiments, the second bracket may be integrally connected to the housing within the hollow interior along the second side surface.

In certain embodiments, the first bracket may be configured to connect to a first surface of the vehicle by a third fastener, and the second bracket may be configured to connect to a second surface of the vehicle by a fourth fastener. In some such embodiments, the first surface of the vehicle may be a first roof surface and the second surface of the vehicle may be a second roof surface. In other such embodiments, the first surface of the vehicle may be a first bumper surface and the second surface of the vehicle may be a second bumper surface. In embodiments where the first surface of the vehicle is a first roof surface and the second surface of the vehicle is a second roof surface, it may be that the top surface of the housing does not extend past a roof top surface of the vehicle when the housing is connected to the vehicle.

In some embodiments, a bottom edge of at least one of the front surface, the first side surface, and/or the second side surface may comprise an adhesive configured to connect the housing to the surface of the vehicle.

In certain embodiments, the housing may further comprise at least one additional surface selected from the group consisting of a bottom surface, a back surface, and combinations thereof.

In some embodiments, the lighting aperture may comprise a liens located within at least a portion of the lighting aperture.

DETAILED DESCRIPTION

Disclosed herein is a housing for connecting a light bar to a vehicle. The housing is described below with reference to the Figures. As described herein and in the claims, the following numbers refer to the following structures as noted in the Figures.

- 10 refers to a vehicle.
- 15 refers to a roof top surface.
- 17 refers to a bumper.
- 100 refers to a housing.
- 110 refers to a front surface.
- 115 refers to a lighting aperture.
- 120 refers to a first side surface.
- 130 refers to a second side surface.
- 140 refers to a top surface.
- 150 refers to a hollow interior.
- 151 refers to a first interior face.
- 152 refers to a second interior face.
- 160 refers to a first bracket.
- 162 refers to a first bracket surface (of the first bracket).
- 163 refers to a second bracket surface (of the first bracket).
- 164 refers to a first hole.
- 170 refers to a second bracket.
- 172 refers to a first bracket surface (of the second bracket).
- 173 refers to a second bracket surface (of the second bracket).
- 174 refers to a second hole.
- 200 refers to a light bar.
- 210 refers to a first side.
- 211 refers to a first fastener.
- 220 refers to a second side.
- 221 refers to a second fastener.
- 230 refers to a front face.
- 235 refers to an opening.
- 237 refers to a lens.
- 240 refers to an extruded aluminum containment structure.
- 250 refers to a circuit board.
- 252 refers to a light-emitting diode.
- 254 refers to a cable assembly.

Figure 1:
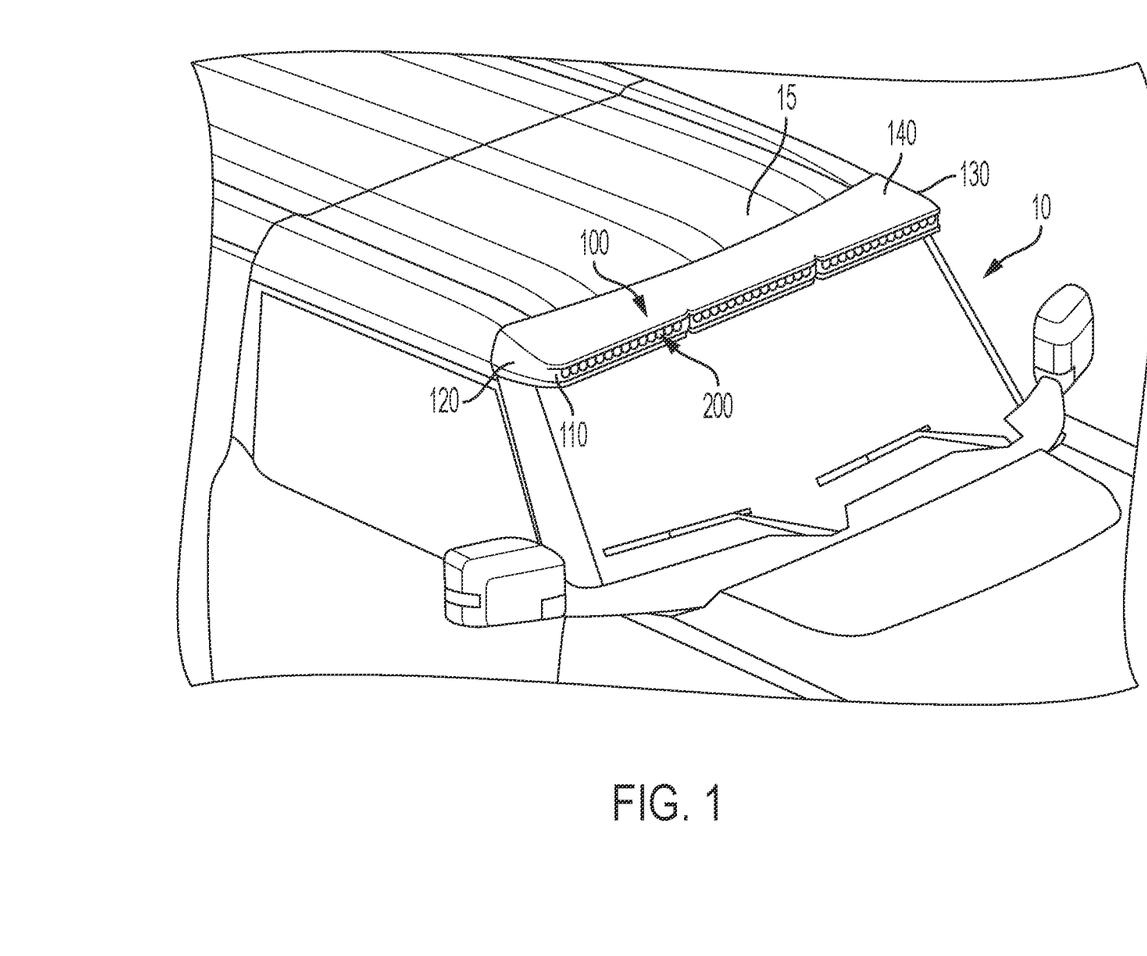
FIG. 1 is a perspective view of one embodiment of a housing for connecting a light bar to a vehicle installed on a vehicle roof.
Figure 3:
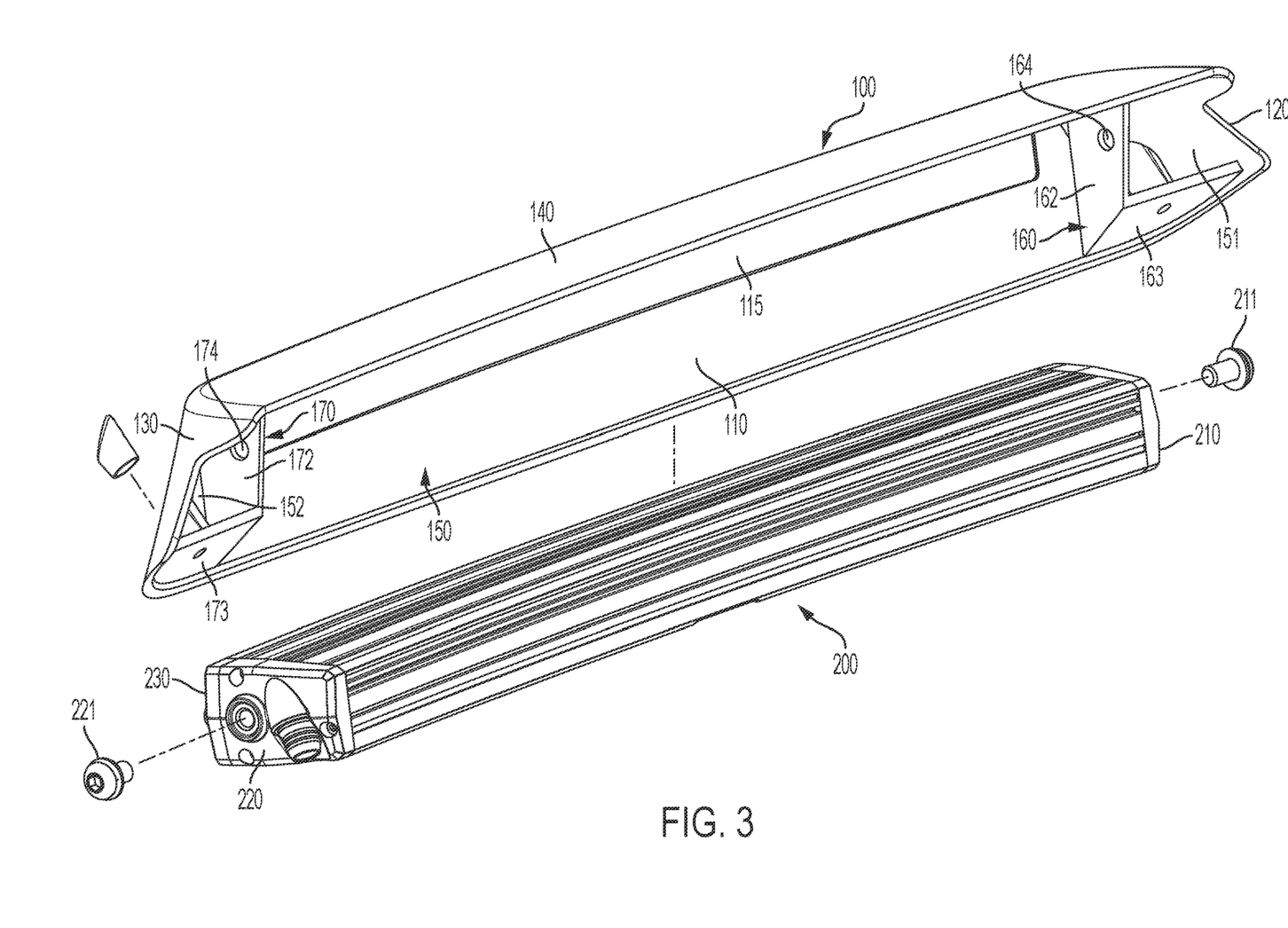
FIG. 3 is an exploded perspective view of an embodiment of a housing and a light bar.

FIG. 1 shows a perspective view of an embodiment of a housing (100) for connecting a light bar (200 as shown in FIG. 3) to a vehicle (10). As shown in FIG. 1, the housing may comprise a front surface (110), a first side surface (120), a second side surface (130) which is opposite of the first side surface, and a top surface (140). The front surface, first side surface, second side surface, and top surface will define a generally hollow interior (150 as shown in FIG. 3). In the embodiment shown in FIG. 1, the housing connects the light bar to a roof top surface (15) of the vehicle. When the housing connects the light bar to a roof top surface (15) of a vehicle (10) as shown in FIG. 1, it is preferred that the top surface (140) of the housing does not extend past the roof top surface as shown in FIG. 1. The housing may connect to the surface of the vehicle along at least a portion of at least one of the front surface, the first side surface, the second side surface, the first bracket (160 as shown in FIG. 3), and/or the second bracket (170 as shown in FIG. 3).

Figure 2:
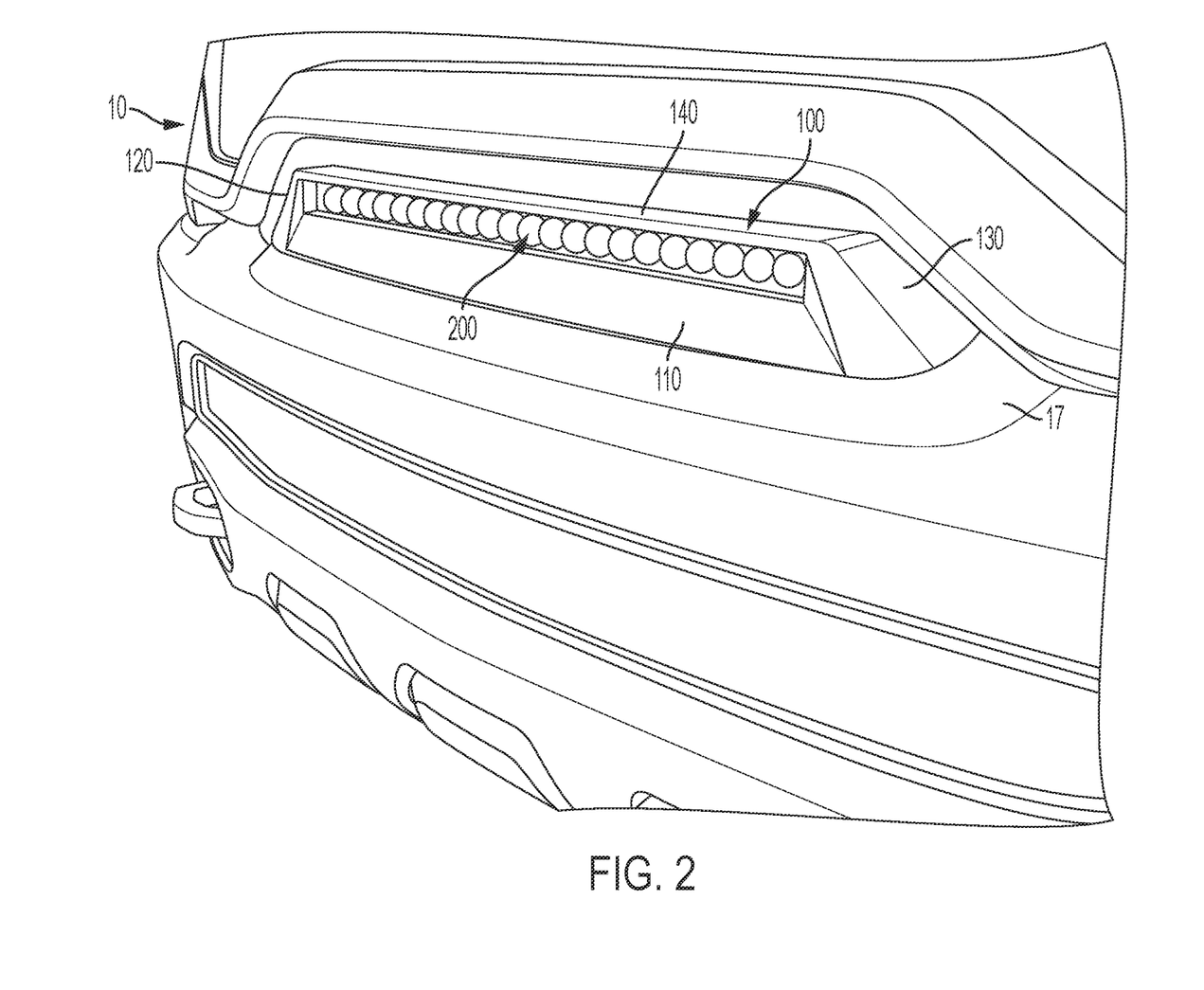
FIG. 2 is a perspective view of one embodiment of a housing for connecting a light bar to a vehicle installed on a vehicle bumper.

FIG. 2 illustrates a perspective view of an alternative embodiment of a housing (100) for connecting a light bar (200 as shown in FIG. 3) to a vehicle (10). Like the embodiment shown in FIG. 1, the housing shown in the embodiment in FIG. 2 may comprise a front surface (110), a first side surface (120), a second side surface (130) which is opposite the first side surface, and a top surface (140). The front surface, first side surface, second side surface, and top surface define a generally hollow interior (150 as shown in FIG. 3). In the embodiment shown in FIG. 2, the housing connects the light bar to a bumper (17) of the vehicle. Like in embodiments which attach to the vehicle roof, the housing may connect to the surface of the vehicle along at least a portion of at least one of the front surface, the first side surface, the second side surface, the first bracket (160 as shown in FIG. 3), and/or the second bracket (170 as shown in FIG. 3).

Figure 4:
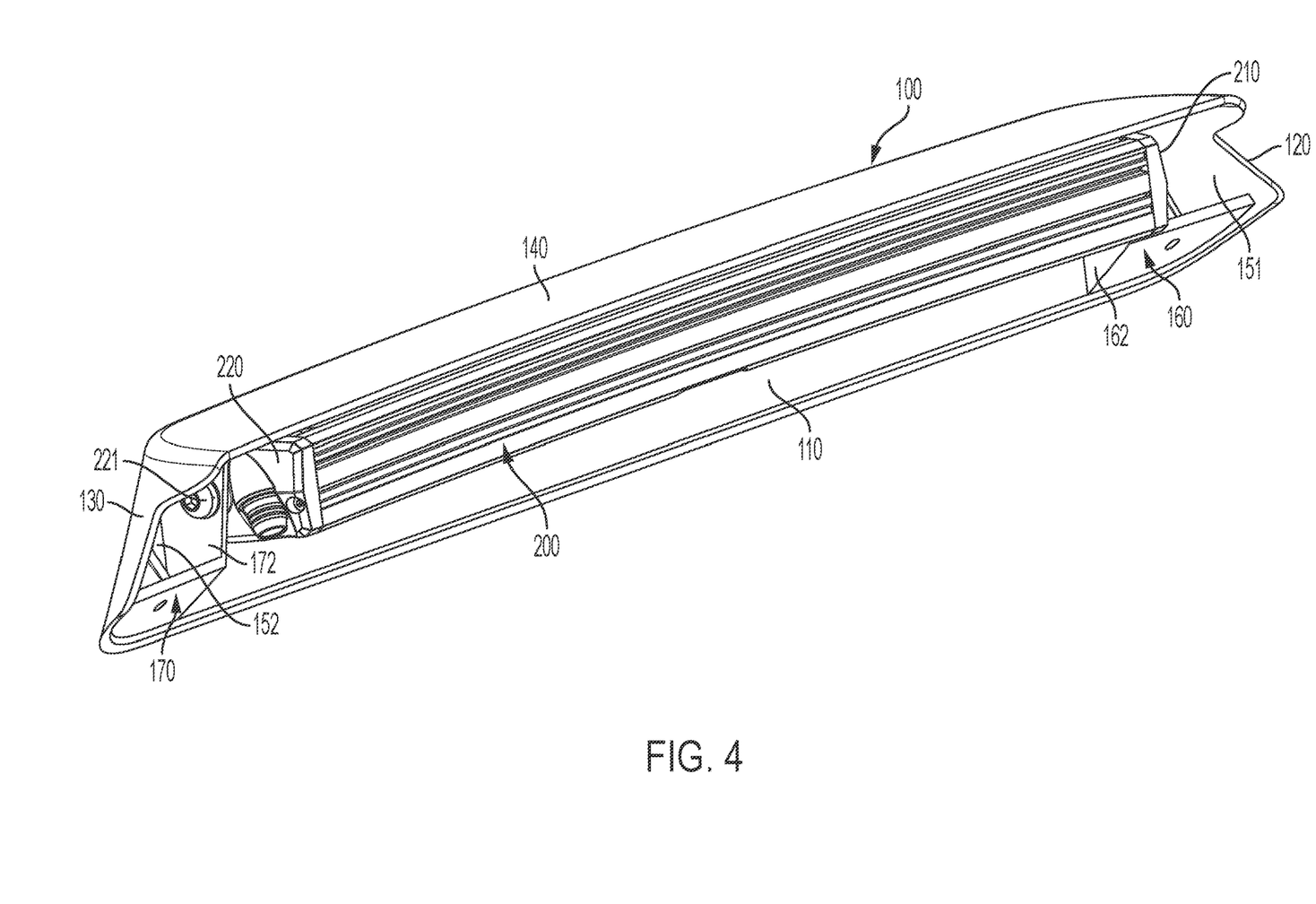
FIG. 4 is an assembled perspective view of an embodiment of a housing and a light bar.

FIG. 3 shows a perspective view of an embodiment of a housing (100) for connecting a light bar (200) to a vehicle (10) with the light bar and the housing separated from one another while FIG. 4 shows the same embodiment in assembled form with the light bar and the housing connected to one another. As shown in FIG. 3, the front surface (110) of the housing may comprise a lighting aperture (115). The lighting aperture will pass the entire way through the front surface. While the lighting aperture may come in many shapes and sizes, the lighting aperture will preferably be sized and shaped to correspond with a front face (230) of the light bar such that light projected from the light bar may project outwardly from the housing. Preferably, the lighting aperture will be sized and shaped so that less than 10% of the light projected by the light bar is blocked by the housing with less than 5% of the light projected by the light bar being blocked by the housing being more preferred, less than 1% of the light projected by the light bar being blocked by the housing being still more preferred and less than 0.1% of the light projected by the light bar being blocked by the housing being most preferred.

In some embodiments, the lighting aperture (115) may comprise a lens located within at least a portion of the lighting aperture. When present, the lens may be fabricated of any number of partially or fully transparent materials including glass, polymer (i.e. —polycarbonate, polyester), and the like. The lens—when present—may be attached to the lighting aperture by any number of mechanisms including adhesives, fasteners (i.e. —screws, bolts, rivets, and the like), a friction fit between the lens and one or more edges of the lighting aperture, and combinations thereof.

Also shown in FIG. 3 is the hollow interior (150) of the housing (100). As shown in FIG. 3, the hollow interior may be defined as the space encompassed by at least the front surface (110), the first side surface (120), the second side surface (130), and the top surface (140). It is within the hollow interior that the light bar (200) resides when the housing is connected to the vehicle (10 as shown in FIG. 1 and FIG. 2). In some embodiments, the hollow interior may be further encompassed by an optional bottom surface (not shown) which spans between the front surface, the first side surface, the top surface, and the second side surface. In certain embodiments, the hollow interior may be encompassed by an optional back surface (not shown) which spans between the optional bottom surface, the first side surface, the front surface, and the second side surface.

Further shown in FIG. 3 is a first bracket (160) and a second bracket (170). As shown in FIG. 3, each of the first bracket and the second bracket may be located within the hollow interior (150) of the housing. The first bracket—as shown in FIG. 4—may be configured to connect a first interior face (151) of the housing to a first side (210) of the light bar. Similarly, the second bracket may be configured to connect a second interior face (152) of the housing to a second side (220) of the light bar as shown in FIG. 4.

While the first bracket (160) and the second bracket (170) may come in many forms, one preferred form is an "L" shaped bracket such as shown in FIG. 3. When used, the "L" shaped bracket will comprise a first bracket surface (162/172) which connects to the corresponding side of the light bar (200) as shown in FIG. 4, and a second bracket surface (163/173) which may be used to connect the housing to a surface of the vehicle.

The first bracket (160) may connect to the first side (210) of the light bar (200) by passing a first fastener (211) through a first hole (164) in the first bracket and into a corresponding hole in the first side of the light bar. Non-limiting examples of such fasteners include a bolt, a screw, a rivet, a clip, and the like. When the first bracket is an "L" shaped bracket, the first hole will pass through the first bracket surface (162) of the first bracket.

Similarly, the second bracket (170) may connect to the second side (220) of the light bar (200) by passing a second fastener (221) through a second hole (174) in the second bracket and into a corresponding hole in the second side of the light bar. Non-limiting examples of such fasteners include a bolt, a screw, a rivet, a clip, and the like. When the second bracket is an "L" shaped bracket, the second hole will pass through the first bracket surface (172) of the second bracket.

In some instances, the first bracket (160) and/or the second bracket (170) may be integrally connected to the housing (100) within the hollow interior (150) as shown in FIG. 3. In such embodiments, the first bracket will preferably be integrally connected to the housing within the hollow interior along the first side surface (120). Similarly, the second bracket will preferably be integrally connected to the housing within the hollow interior along the second side surface (130). The first bracket and/or the second bracket may be integrally connected to the housing by any number of methods including manufacturing the housing and the brackets of a single integral piece of material (i.e. —by injection molding, casting, milling, 3D printing, or the like) or by manufacturing the housing and the brackets of separate pieces of material and permanently attaching the brackets to the housing (i.e. —by welding or the like).

Figure 7:
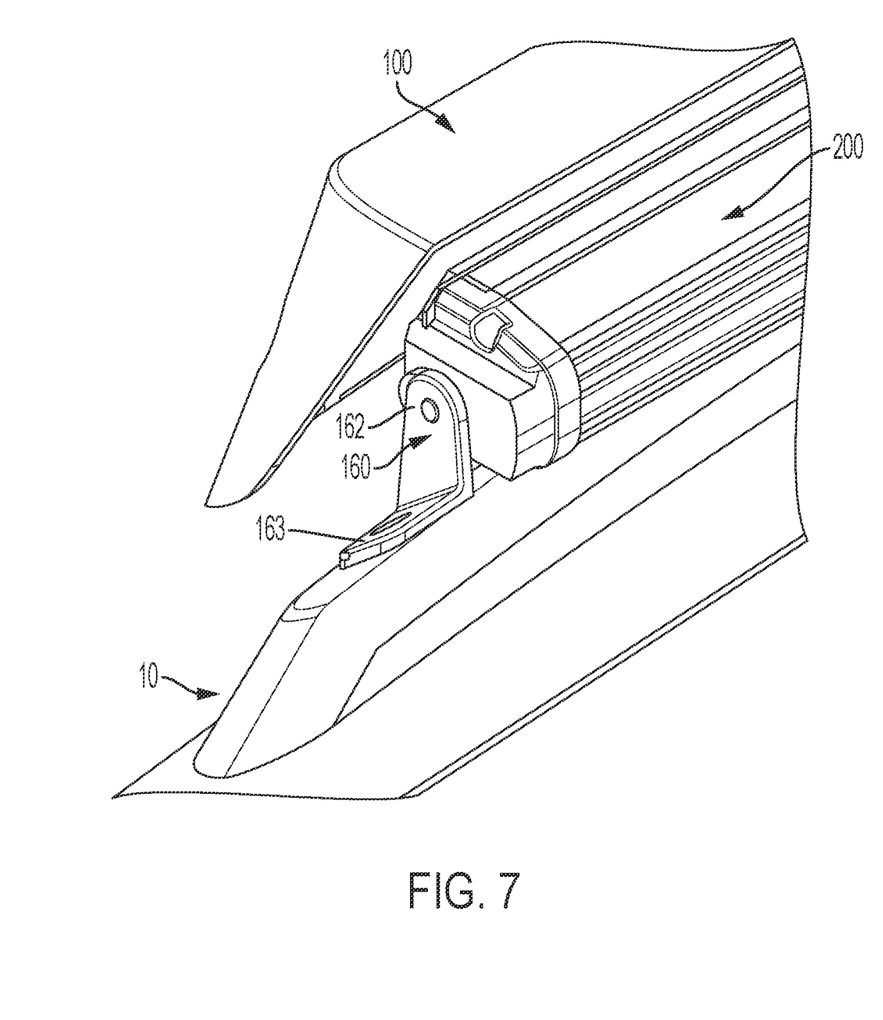
FIG. 7 is an exploded perspective view of an embodiment of a housing and a light bar.

In other embodiments, the first bracket (160) and/or the second bracket (170) may be removably connected to the housing (100) within the hollow interior (150). One such embodiment is shown in FIG. 7. In such embodiments, the first bracket will preferably be removably connected to the housing within the hollow interior along the first side surface (120). Similarly, the second bracket will preferably be removably connected to the housing within the hollow interior along the second side surface (130). In some such embodiments, the bracket(s) may be configured to frictionally engage with the housing such that the brackets "snap" into the housing (i.e.—using a tongue and groove connection or the like). In other embodiments, the bracket(s) may be configured to connect to the housing by a fastener such as a bolt (with or without a nut), a screw, a rivet, a clip, a clamp, or the like.

Figure 5:
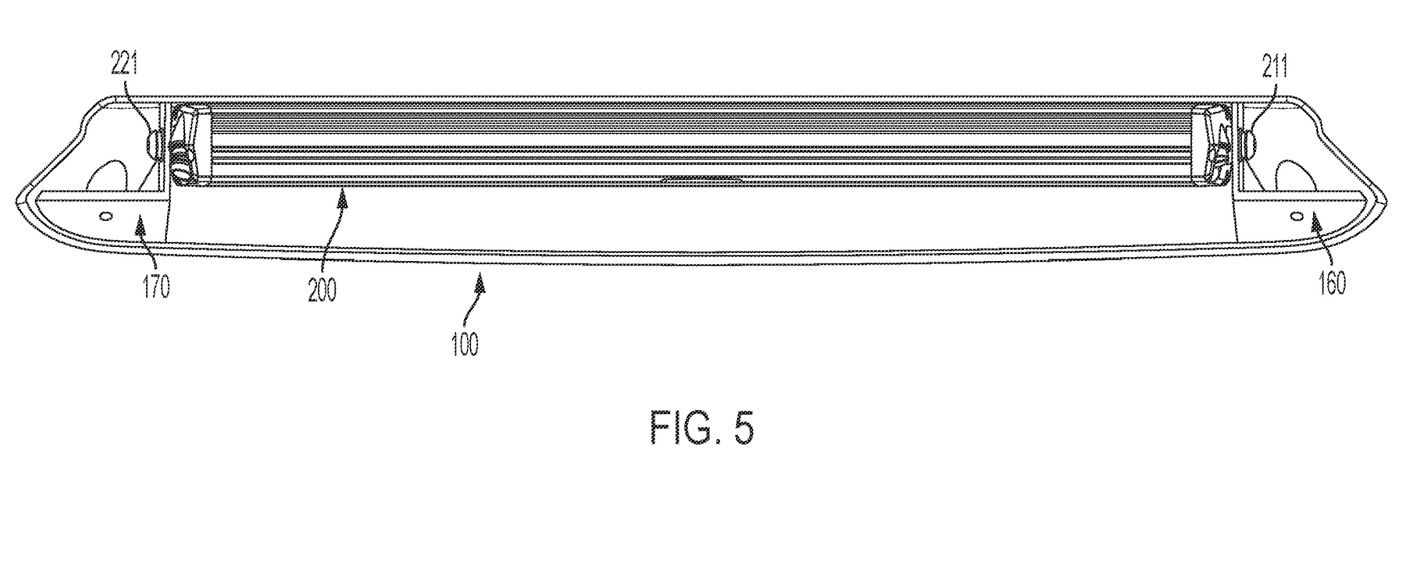
FIG. 5 is a bottom view of an embodiment of a housing and a light bar.

FIG. 5 shows a bottom view of one embodiment of a housing (100). As shown in FIG. 5, the brackets (160 and 170) connect to the housing within the hollow interior of the housing. In the embodiment shown in FIG. 5, the brackets are "L" shaped brackets with a first portion of the bracket connecting to the top surface (140 as shown in FIG. 3) of the housing and a second portion of the bracket connecting to the front surface (110 as shown in FIG. 3) of the housing. The fasteners (211 and 221) then pass through the brackets to connect to the sides of the light bar to the housing as shown in FIG. 5.

The housing (100) may be configured to connect to a surface of a vehicle (10)—which may be either a roof top surface (15) of a vehicle or a bumper (17) surface of a vehicle in the embodiments as shown in the Figures. One of ordinary skill will also recognize that the surface of the vehicle may also be a front bumper surface, a hood surface, a grill surface, a rear bumper surface, or a trunk lid surface. For example, the connections may be between a first bracket (160) and a first bumper surface of a bumper (17) and/or a second bracket (170) and a second bumper surface of the bumper.

As shown in the Figures, the first bracket surface (162) of the first bracket (160) is connected to the first side (210) of the light bar (200) by the first fastener (211). The second bracket surface (163) of the first bracket is then connected to a first surface of the vehicle (i.e.—a first roof surface or a first bumper surface). The second bracket surface of the first bracket may be connected to the first surface of the vehicle by a fastener—such as a bolt, a screw, a rivet, a clip, or the like. In addition to or instead of a fastener, the second bracket surface may be connected to the first surface of the vehicle by way of an adhesive or a tape. In other embodiments the second bracket surface of the first bracket may not connect to the first vehicle surface at all. Instead, one or more of at least a portion of the front surface (110), at least a portion of the first side surface (120), at least a portion of the second side surface (130), at least a portion of the top surface (140), at least a portion of the (optional) back surface, and/or at least a portion of the (optional) bottom surface may be used to connect to a surface of the vehicle.

Figure 6:
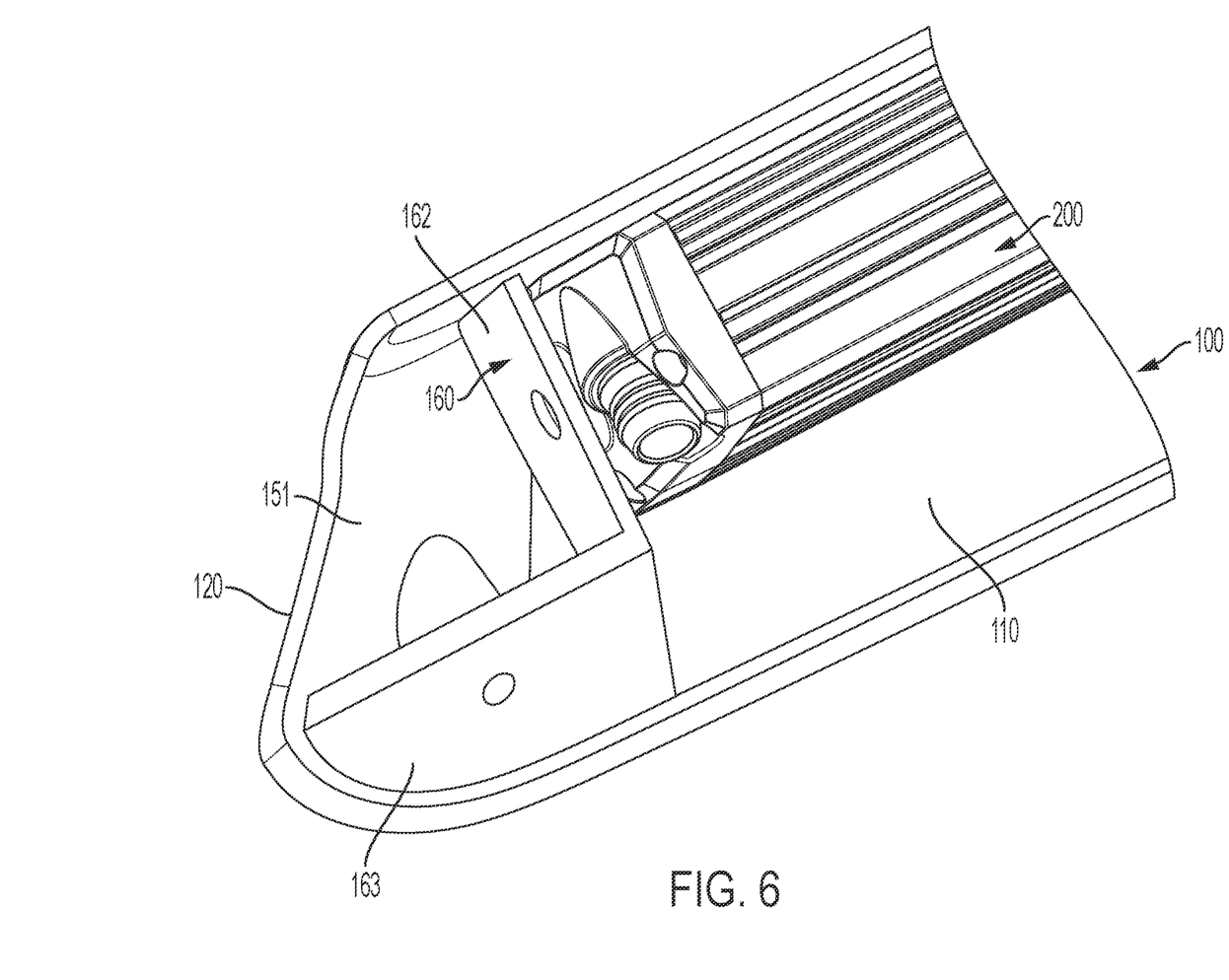
FIG. 6 is a view of a bracket for connecting a housing to a light bar and a vehicle.

FIG. 6 shows a close-up view of an embodiment of a bracket—which in this case is labelled as the first bracket (160) but may also be the second bracket (170). As shown in FIG. 6, the first bracket is in the form of an "L" shaped bracket integrally connected within the hollow interior of the housing (100). The first bracket surface (162) of the first bracket in the embodiment shown in FIG. 6 is integrally connected to and extends downwardly from the interior face of the top surface (140) of the housing. The second bracket surface (163) of the first bracket then extends substantially perpendicular from (or perpendicular from) the first bracket surface with the second bracket surface integrally connected to and extending from the interior face of the first side surface (120).

FIG. 7 shows one alternative embodiment of the housing (100) in which one or more of the brackets is removably connected to the housing within the hollow interior. As shown in FIG. 7, the bracket—which in this case is labelled as the first bracket (160) but may also be the second bracket (170)—is in the form of an "L" shaped bracket. The first bracket surface (162) of the first bracket in FIG. 7 is connected to the first side (210) of the light bar (200) by a fastener. The second bracket surface (163) of the first bracket is then connected to a surface of the vehicle—which in this case is a bumper surface (17), but may also be a roof top surface, a grill surface, a rear bumper surface, or a trunk lid surface. The connection between the second bracket surface and the surface of the vehicle may be by way of a fastener or by an adhesive or a tape. The housing then fits over the light bar and the brackets.

In the embodiment shown in FIG. 7 the housing (100) may be connected to one or both of the vehicle surface—roof top surface, front bumper surface, grill surface, rear bumper surface, trunk lid surface—the light bar (200) and/or the bracket(s) by many different mechanisms. One such mechanism is a friction fit between at least a portion of the housing on one hand and the vehicle surface, light bar, and/or bracket(s) such that the housing "snaps" onto the vehicle surface, light bar, and/or brackets. Another mechanism may involve the use of an adhesive or tape applied between one or more of the housing surfaces—front surface, first side surface, second side surface, top surface, optional bottom surface, and/or optional back surface—on one hand and the vehicle surface, light bar, and/or bracket(s) on the other hand. Another mechanism may involve the use of one or more secondary bracket(s) which connect between an interior face of one or more of the housing surfaces and a surface of the vehicle. When used, the secondary bracket(s) may connect to the interior face of the housing surface and/or the surface of the vehicle in a number of manners including by way of fastener(s), adhesive(s), tape(s), and/or by a friction fit.

In preferred embodiments the housing may be contoured on the surface(s) which is/are to connect to the vehicle to substantially match the shape of the vehicle surface to which the housing will be connected. That is to say that at least a bottom edge of each of the front surface, the first side surface, the second side surface, and the top surface may be contoured to substantially match the exterior surface profile of the vehicle surface—roof surface, front bumper surface, grill surface, rear bumper surface, trunk lid surface—to which the housing will be mounted. In embodiments where the housing comprises an optional back surface, a bottom edge of the optional back surface may also be contoured to substantially match the exterior surface profile of the vehicle surface to which the housing will be mounted. When the housing comprises an optional bottom surface, an exterior face of the bottom surface may also be contoured to substantially match the exterior surface profile of the vehicle surface to which the housing will be mounted. Contouring the housing surface(s) to substantially match the exterior profile of the vehicle surface to which the housing will be mounted may be particularly beneficial when the housing is to be connected to the vehicle by an adhesive applied between the housing surface(s) and the vehicle surface(s).

Figure 8:
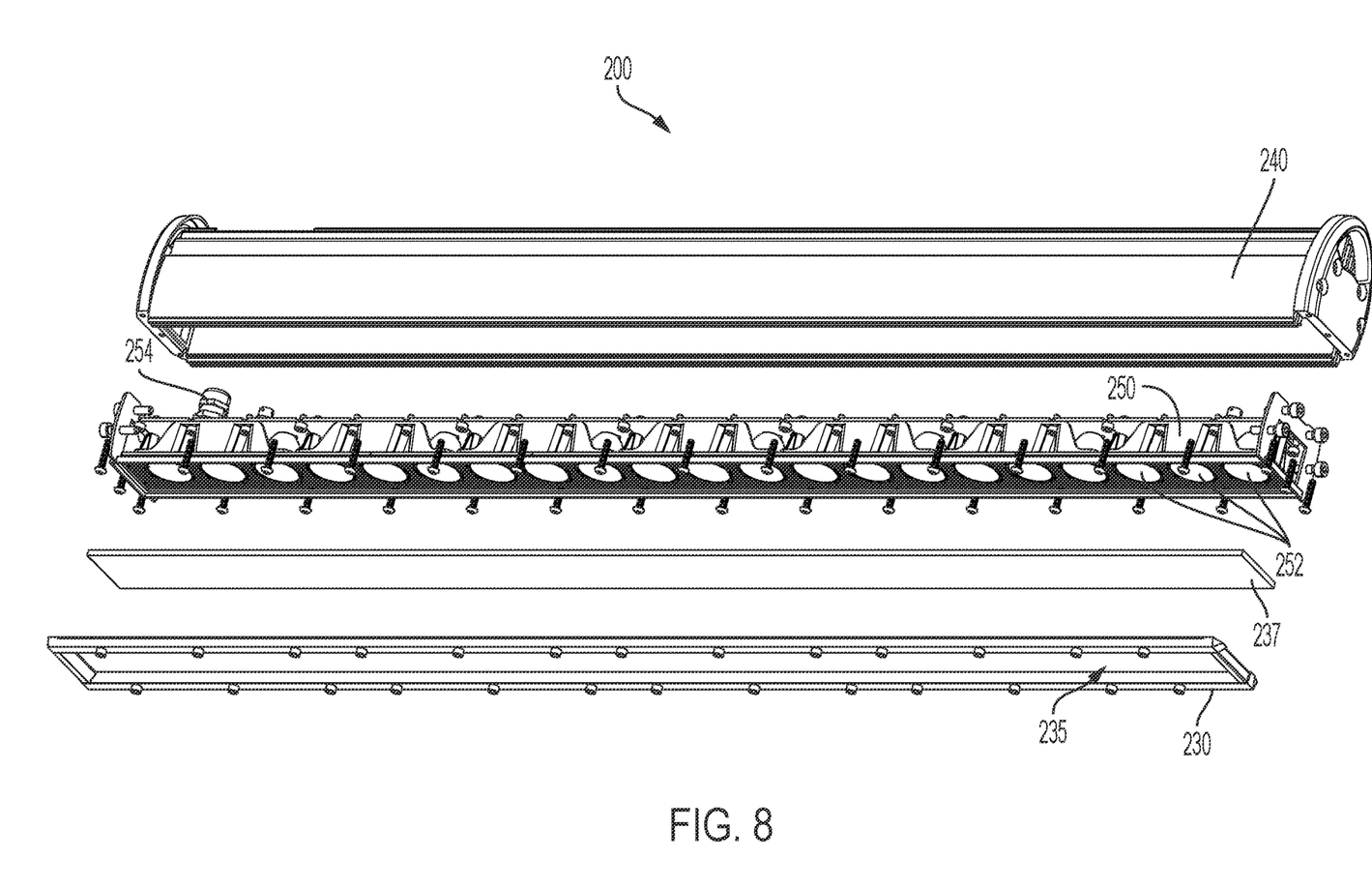
FIG. 8 is an exploded perspective view of one embodiment of a light bar.
Figure 9:
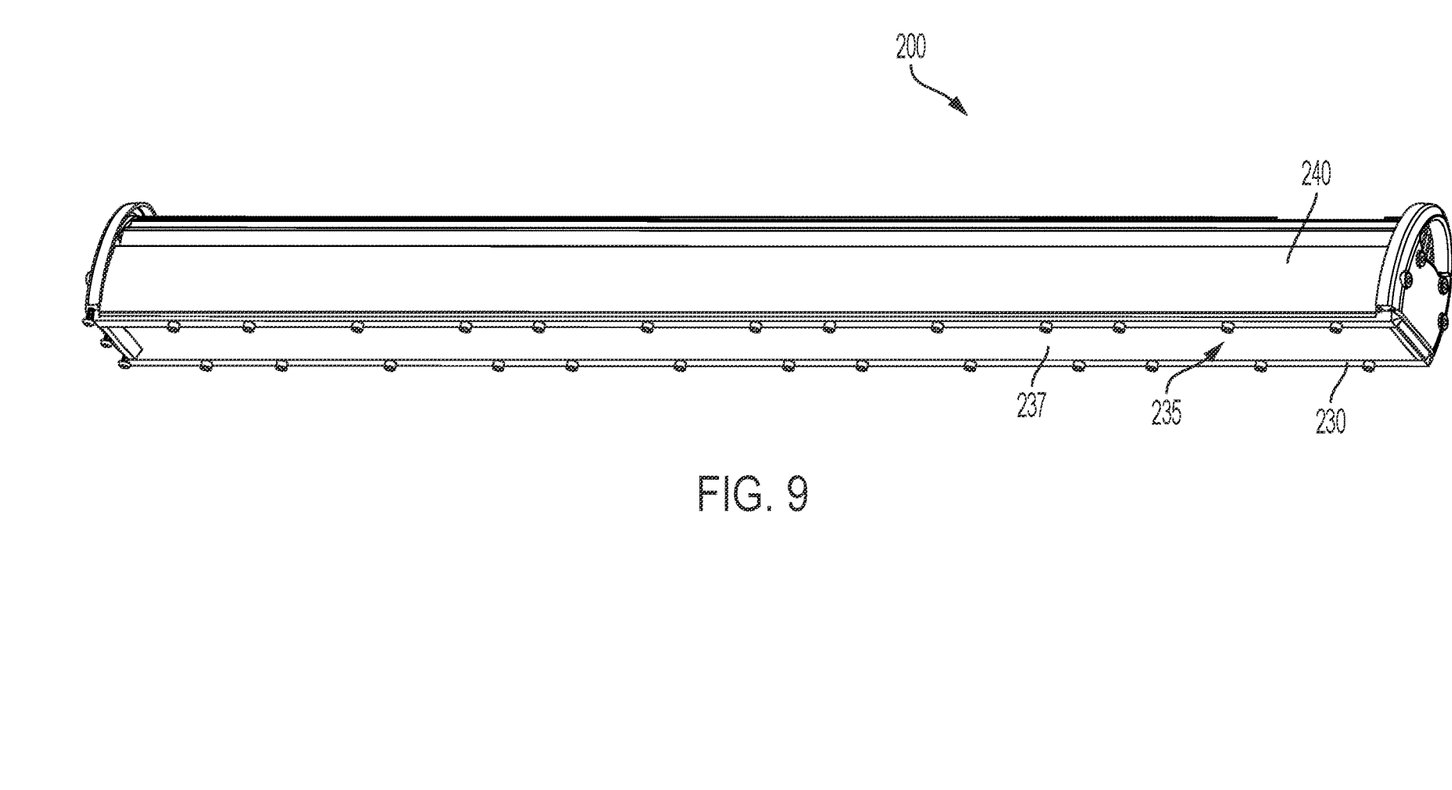
FIG. 9 is an assembled perspective view of the embodiment of a light bar shown in FIG. 8.

FIG. 8 and FIG. 9 show additional details of one embodiment of a light bar (200). In general, a light bar may comprise an extruded aluminum containment structure (240). A circuit board (250) may be attached to the extruded aluminum containment structure with a plurality of light-emitting diodes (LEDs) (252) mounted to the circuit board. A cable assembly (254) is attached to and extends from the circuit board for connection to the vehicle's power system (battery and switches—not shown). The front face (230) of the extruded aluminum containment structure will include an opening (235) which allows the LEDs to project light outwardly from the light bar upon receiving electricity from the vehicle's power system. This opening may include a lens (237) made of glass, polycarbonate, or other transparent material which seals the light bar within the extruded aluminum containment structure to prevent water and road debris from entering the light bar and damaging the electronics thereof.

Optionally, the light bar (200) may include optics and/or reflector cones. The optics—when present—may change the appearance of the light emitted from one or more of the LED's (252). When utilized—the reflector cones may focus the light emitted from one or more of the LED's. In some embodiments, the reflector cones may include a plastic (transparent polycarbonate, transparent polyester, etc.) lens which covers a portion of the reflector cone.

The housing disclosed herein allows for mounting of a light bar to a vehicle in a manner which is aesthetically pleasing with all hardware or fasteners concealed by the surfaces of the housing. Additionally, unlike the prior art solutions, the embodiments disclosed herein reduce the amount of hardware used for connecting the light bar to the vehicle. The embodiments disclosed herein further allow the light bar to be connected to the vehicle in a manner which reduces resulting disruptions in the aerodynamic profile of the vehicle.

What is claimed is:

1. A housing (100) for connecting a light bar (200) to a vehicle (10), said housing comprising:
   a front surface (110), a first side surface (120), a second side surface (130), and a top surface (140) defining a hollow interior (150); and
   at least a first bracket (160) and a second bracket (170) located within the hollow interior; and
wherein the front surface comprises a lighting aperture (115), the first bracket is configured to connect a first interior face (151) of the housing to a first side (210) of the light bar, the second bracket is configured to connect a second interior face (152) of the housing to a second side (220) of the light bar, and at least a portion of at least one of the front surface, the first side surface, the second side surface, the first bracket, and/or the second bracket is configured to connect to a surface of the vehicle.

2. The housing of claim 1, wherein a first fastener (211) connects the first bracket to the first side of the light bar.

3. The housing of claim 1, wherein a second fastener (221) connects the second bracket to the second side of the light bar.

4. The housing of claim 1, wherein the first bracket is removably connected to the housing within the hollow interior along the first side surface.

5. The housing of claim 4, wherein the first bracket is configured to frictionally engage with the housing.

6. The housing of claim 4, wherein the first bracket is configured to connect to the housing by a fifth fastener.

7. The housing of claim 1, wherein the second bracket is removably connected to the housing within the hollow interior along the second side surface.

8. The housing of claim 7, wherein the second bracket is configured to frictionally engage with the housing.

9. The housing of claim 7, wherein the second bracket is configured to connect to the housing by a sixth fastener.

10. The housing of claim 1, wherein the first bracket is integrally connected to the housing within the hollow interior along the first side surface.

11. The housing of claim 1, wherein the second bracket is integrally connected to the housing within the hollow interior along the second side surface.

12. The housing of claim 1, wherein the first bracket is configured to connect to a first surface of the vehicle by a third fastener, and the second bracket is configured to connect to a second surface of the vehicle by a fourth fastener.

13. The housing of claim 12, wherein the first surface of the vehicle is a first roof surface and the second surface of the vehicle is a second roof surface.

14. The housing of claim 13, wherein the top surface of the housing does not extend past a roof top surface (15) of the vehicle when the housing is connected to the vehicle.

15. The housing of claim 12, wherein the first surface of the vehicle is a first bumper surface and the second surface of the vehicle is a second bumper surface.

16. The housing of claim 1, wherein a bottom edge of at least one of the front surface, the first side surface, and/or the second side surface comprises an adhesive configured to connect the housing to the surface of the vehicle.

17. The housing of claim 1, further comprising at least one additional surface selected from the group consisting of a bottom surface, a back surface, and combinations thereof.

18. The housing of claim 1, wherein the lighting aperture comprises a lens located within at least a portion of the lighting aperture.

* * * * *